United States Patent
Inoue et al.

(10) Patent No.: US 6,404,603 B1
(45) Date of Patent: Jun. 11, 2002

(54) THIN FILM DEVICE, THIN FILM HEAD, AND MAGNETORESISTIVE ELEMENT

(75) Inventors: Toru Inoue; Koichi Terunuma, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/409,429

(22) Filed: Sep. 30, 1999

(30) Foreign Application Priority Data

Oct. 6, 1998 (JP) .......................................... 10-284342

(51) Int. Cl.⁷ ........................... G11B 5/235; G11B 5/33; B32B 19/00; B32B 9/00
(52) U.S. Cl. ....................................... 360/320; 428/698
(58) Field of Search ................................. 360/320, 313, 360/110, FOR 213, 120, 126; 428/698, 469, 702

(56) References Cited

U.S. PATENT DOCUMENTS

| | | | |
|---|---|---|---|
| 5,085,923 A | * 2/1992 | Yamakawa et al. | 428/209 |
| 5,520,785 A | * 5/1996 | Evans et al. | 204/192.27 |
| 5,571,603 A | * 11/1996 | Utumi et al. | 428/212 |
| 5,789,056 A | * 8/1998 | Bian et al. | 8/65.3 |
| 6,051,303 A | * 4/2000 | Katsuda et al. | 428/138 |
| 6,188,549 B1 | * 2/2001 | Wiitala | 360/320 |

FOREIGN PATENT DOCUMENTS

| JP | A-5-205224 | 8/1993 | |
|---|---|---|---|
| JP | 2000-18781 7 C | * 7/2000 | |

OTHER PUBLICATIONS

Aita et al, "The dependence of aluminum nitride film crystallography on sputtering plasma composition", Apr.–Jun. 1983, J. Vac. Sci. Tech. A 1, 2, 403.*
Chu et al, "The preparation and properties of aluminum nitride films", 1975, J. Electrochem. Soc., 122, 995.*

* cited by examiner

*Primary Examiner*—Robert S. Tupper
*Assistant Examiner*—Julie Anne Watko
(74) *Attorney, Agent, or Firm*—Oliff & Berridge, PLC

(57) ABSTRACT

An object of the invention is to improve thermal conductivity of a first and a second shield gap films and to suppress a rise in temperature in an MR element.

A first shield gap film and a second shield gap film are formed of an insulating film which includes AlN as a main component and the (002) plane of AlN is oriented to the vertical direction to the surface of the insulating film. As a result, higher thermal conductivity can be attained compared to the case where a plurality of crystal surfaces of AlN are oriented to the vertical direction to the surface of the insulating film, and the heat generated in the MR element can be effectively dissipated. The insulating film may include a small amount of Ar. In such a case, the hardness is increased preventing the first and second shield gap films from being excessively polished when forming an air bearing surface. The insulating film may also include oxygen. If the insulating film includes oxygen, the stress is decreased and exfoliation of the insulating film is avoided.

14 Claims, 9 Drawing Sheets

THIN FILM DEVICE, THIN FILM HEAD, AND MAGNETORESISTIVE ELEMENT

BACKGROUND OF THE INVENTION

1. Field of the Invention

The invention relates to a thin film device comprising an insulating film, a thin film magnetic head including a pair of shield gap films made of an insulating film placed to sandwich a magnetoresistive element in between, a magnetoresistive element on which an insulating film is partially formed, and methods of manufacturing the same.

2. Description of the Related Art

Today, a composite thin film magnetic head is widely used as a thin film magnetic head. The composite thin film magnetic head has a layered structure which includes a recording head with an inductive-type magnetic transducer for writing and a reproducing head with a magnetoresistive (also referred as MR in the followings) element for reading-out. For example, as a reproducing head, an MR element sandwiched by a pair of shield films with a pair of shield gap films in between, is popular. Each shield gap film is provided for electrically isolating the MR element and each shield film, and is made of, for example, aluminum oxide ($Al_2O_3$) with high insulating characteristic.

In such thin film magnetic head, performance improvement in a reproducing head has been sought in accordance with improvement in surface recording density of a hard disk drive in recent years. Methods of increasing reproducing output of a reproducing head are: increasing amount of sense current flowing into an MR element; and shortening the MR height. The MR height is the length (height) between the end of the air bearing surface (the surface facing the recording medium) side and the end of the other side.

If the amount of sense current flown into the MR element is increased, however, Joule heat generated by the resistance increases resulting in a rise in the temperature of the MR element. As a result, reproducing output decreases and the MR element may not last long. Also, if the MR height is made shorter, Joule heat generated by the resistance increases resulting in a rise in the temperature of the MR element. Accordingly, reproducing output decreases and life of the MR element becomes shorter. Therefore, it is necessary to suppress a rise in the temperature of the MR element when increasing sense current or shortening the MR height.

In the related art, however, each shield gap film, which directly has a contact with the MR element, is made of aluminum oxide with a low thermal conductivity so that the heat generated in the MR element can not be effectively transmitted to each shield film. As a result, the heat of the MR element can not be effectively dissipated. In other words, a rise in the temperature of the MR element can not be suppressed so that the amount of sense current and the MR height are limited. Therefore, reproducing output can not be sufficiently improved.

Recently, to solve this problem, it is proposed in Japanese Patent laid-open Hei 5-205224 to form each shield gap film with aluminum nitride (AlN) with high thermal conductivity. In the related art, only an idea of forming each shield gap film with aluminum nitride is proposed.

Although the thermal conductivity of aluminum nitride is higher compared to that of aluminum nitride, it is not high enough to sufficiently increase reproducing output. Accordingly, sufficient radiation effect can not be expected only by simply forming each shield gap film with aluminum nitride.

In addition, the hardness of aluminum nitride is lower than that of the aluminum oxide. Accordingly, if the shield gap film is formed of aluminum nitride, the shield gap film is further polished compared to each shield film and the MR element at the time of polishing the air bearing surface, leaving a concave in the air bearing surface.

Further, aluminum nitride has a larger residual stress compared to aluminum oxide. Accordingly, if the shield gap film is formed of aluminum nitride, it becomes easy to exfoliate.

The invention is designed to overcome the foregoing problems. The first object is to provide a thin film device, a thin film magnetic head, a magnetoresistive element in which the thermal conductivity of the insulating film is improved, and methods of manufacturing the same.

The second object of the invention is to provide a thin film device, a magnetoresistive element device in which the thermal conductivity and the hardness of the insulating film is improved, and methods of manufacturing the same.

The third object of the invention is to provide a thin film device, a thin film magnetic head, a magnetoresistive element device in which the thermal conductivity of the insulating film is improved while the stress is decreased, and methods of manufacturing the same.

SUMMARY OF THE INVENTION

A thin film device of the invention comprises an insulating film which includes aluminum nitride, the (002) plane of which is oriented to the direction vertical to the surface of the insulating film.

In a thin film magnetic device of the invention, the (002) plane of aluminum nitride included in the insulating film is oriented to the direction vertical to the surface of the insulating film. As a result, a higher thermal conductivity can be obtained in the insulating film compared to the case where a plurality of crystal faces are oriented or to the case including aluminum nitride which is not oriented.

In a thin film device of the invention, the insulating film may include argon to obtain a higher hardness in the insulating film. For example, it is preferable that the content of argon by percentage lies within the range of 0.1 atomic % and 5.0 atomic %, or more preferable that it lies within the range of 1.0 atomic % and 3.0 atomic %. It is most preferable that it falls within the range of 1.5 atomic % and 2.5 atomic %.

Further, in a thin film device of the invention, the insulating film may include oxygen resulting in a decrease in stress. At least some portion of oxygen included in the insulating film may be chemically combined to at least either aluminum or nitride. It is preferable that the content of oxygen by percentage is lies within the range of 1 atomic % and 25 atomic %, or more preferable that it lies within the range of 5 atomic % and 20 atomic %. It is most preferable that it falls within the range of 10 atomic % and 15 atomic %.

A thin film magnetic head of the invention comprises: a magnetoresistive element; a first shield film and a second shield film placed to face each other sandwiching the magnetoresistive element in between for shielding the magnetoresistive element; a first shield gap film provided between the first shield film and the magnetoresistive element; and a second shield gap film provided between the second shield film and the magnetoresistive element. In the thin film magnetic head, at least part of at least either the first shield gap film or the second shield gap film is composed of an insulating film which includes aluminum nitride, the (002) plane of which is oriented to the direction vertical to the surface of the insulating film.

In a thin film magnetic head of the invention, information is read out by flowing sense current into a magnetoresistive element. At this time, Joule heat is generated by sense current in the magnetoresistive element. The heat is transmitted to a first shield film and a second shield film through a first shield gap film and a second shield gap film, respectively, to be dissipated. At least part of either the first shield gap film or the second shield gap film includes aluminum nitride, the (002) plane of which is oriented to the direction vertical to the surface of the insulating film. Accordingly, at least either the first shield gap film or the second shield gap film comes to have high thermal conductivity. As a result, the heat generated in the magnetoresisitve element is effectively dissipated and a rise in the temperature is suppressed.

In a thin film magnetic head of the invention, the insulating film composing at least part of either a first shield gap film or a second shield gap film may further include argon. In such a case, the hardness of at least either the first shield gap film or the second shield gap film is high. As a result, when controlling the length of the magnetoresistive element by polishing, excessive polishing of the first shield gap film and the second shield gap film is avoided.

In a thin film magnetic head of the invention, the insulating film composing at least part of either a first shield gap film or a second shield gap film may further include oxygen. In such a case, the stress of at least either the first shield gap film or the second shield gap film is decreased. As a result, exfoliation of the first shield gap film and the second shield gap film is avoided.

A magnetoresistive element of the invention comprises an insulating film being formed at least partially. In the magnetoresistive element, the insulating film includes aluminum nitride, the (002) plane of which is oriented to the direction vertical to the surface of the insulating film.

In a magnetoresistive element of the invention, the (002) plane of aluminum nitride included in the insulating film is oriented to the direction vertical to the surface of the insulating film so that thermal conductivity of the insulating film is high. Accordingly, the heat generated in the magnetoresistive element is effectively dissipated and a rise in the temperature of the magnetoresistive element is suppressed.

In a magnetoresistive element of the invention, the insulating film may further include argon. In such a case, the hardness of the insulating film is high and manufacturing becomes easy. Further, the insulating film may include oxygen. In such a case, the stress of the insulating film is decreased and exfoliation is avoided.

A method of manufacturing a thin film device of the invention includes the step of forming an insulating film which includes aluminum nitride, the (002) plane of which is oriented to the direction vertical to the surface of the insulating film using sputtering.

In a method of manufacturing a thin film device of the invention, an insulating film which includes aluminum nitride, the (002) plane of which is oriented to the direction vertical to the surface of the insulating film is formed using sputtering.

In a method of manufacturing a thin film device of the invention, an insulating film which further includes argon may be formed by performing sputtering in an atmosphere including argon. An insulating film which further includes oxygen may be formed by performing sputtering in an atmosphere including oxygen.

A method of manufacturing a thin film magnetic head of the invention includes the step of stacking a first shield gap film, a magnetoresistive element, a second shield gap film and a second shield film in order on a first shield film. In the method, at least part of at least either the first shield gap film or the second shield gap film is formed of an insulating film which includes aluminum nitride, the (002) plane of which is oriented to the direction vertical to the surface of the insulating film using sputtering.

In a method of manufacturing a thin film magnetic head, at least part of at least either the first shield gap film or the second shield gap film is formed of an insulating film which includes aluminum nitride, the (002) plane of which is oriented to the direction vertical to the surface of the insulating film using sputtering.

In a method of manufacturing a thin film magnetic head of the invention, at least part of at least either the first shield gap film or the second shield gap film may be formed of an insulating film which further includes argon by performing sputtering in an atmosphere including argon. Further, at least part of at least either the first shield gap film or the second shield gap film may be formed of an insulating film which further includes oxygen by performing sputtering in an atmosphere including oxygen.

A method of manufacturing a magnetoresistive element of the invention is for manufacturing a magnetoresistive element on which an insulating film is at least partially formed. In the method, the insulating film which includes aluminum nitride, the (002) plane of which is oriented to the direction vertical to the surface of the insulating film is formed using sputtering.

In a method of manufacturing a thin film magnetic head of the invention, an insulating film including aluminum nitride, the (002) plane of which is oriented to the direction vertical to the surface of the insulating film is formed using sputtering.

In a method of manufacturing a magnetoresistive element of the invention, an insulating film which further includes argon may be formed by performing sputtering in an atmosphere including argon. Further, an insulating film which further includes oxygen may be formed by performing sputtering in an atmosphere including oxygen.

Other and further objects, features and advantages of the invention will appear more fully from the following description.

DETAILED DESCRIPTION OF THE PREFERRED EMBOFDIMENTS

In the followings, an embodiment of the invention will be described in detail with reference to the drawings.

Figure 1A:
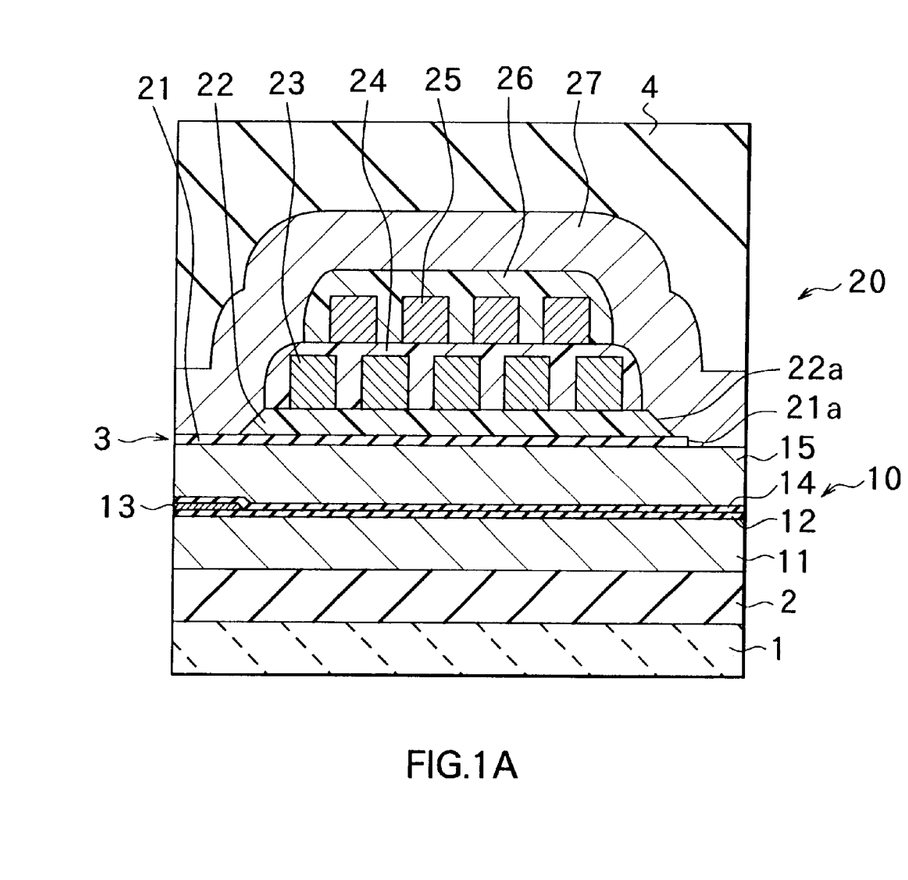
FIGS. 1A and 1B are cross sections showing a configuration of a thin film magnetic head according to an embodiment of the invention.
Figure 1B:
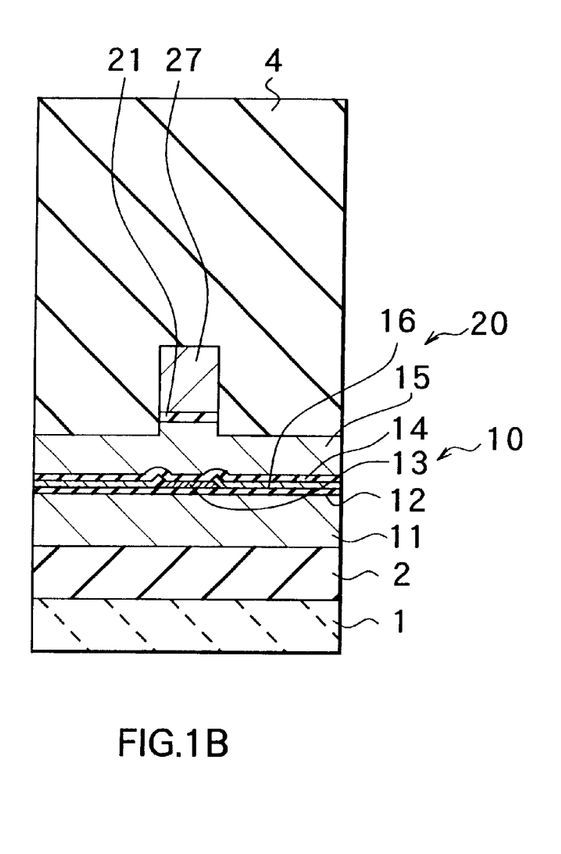
Figure 2:
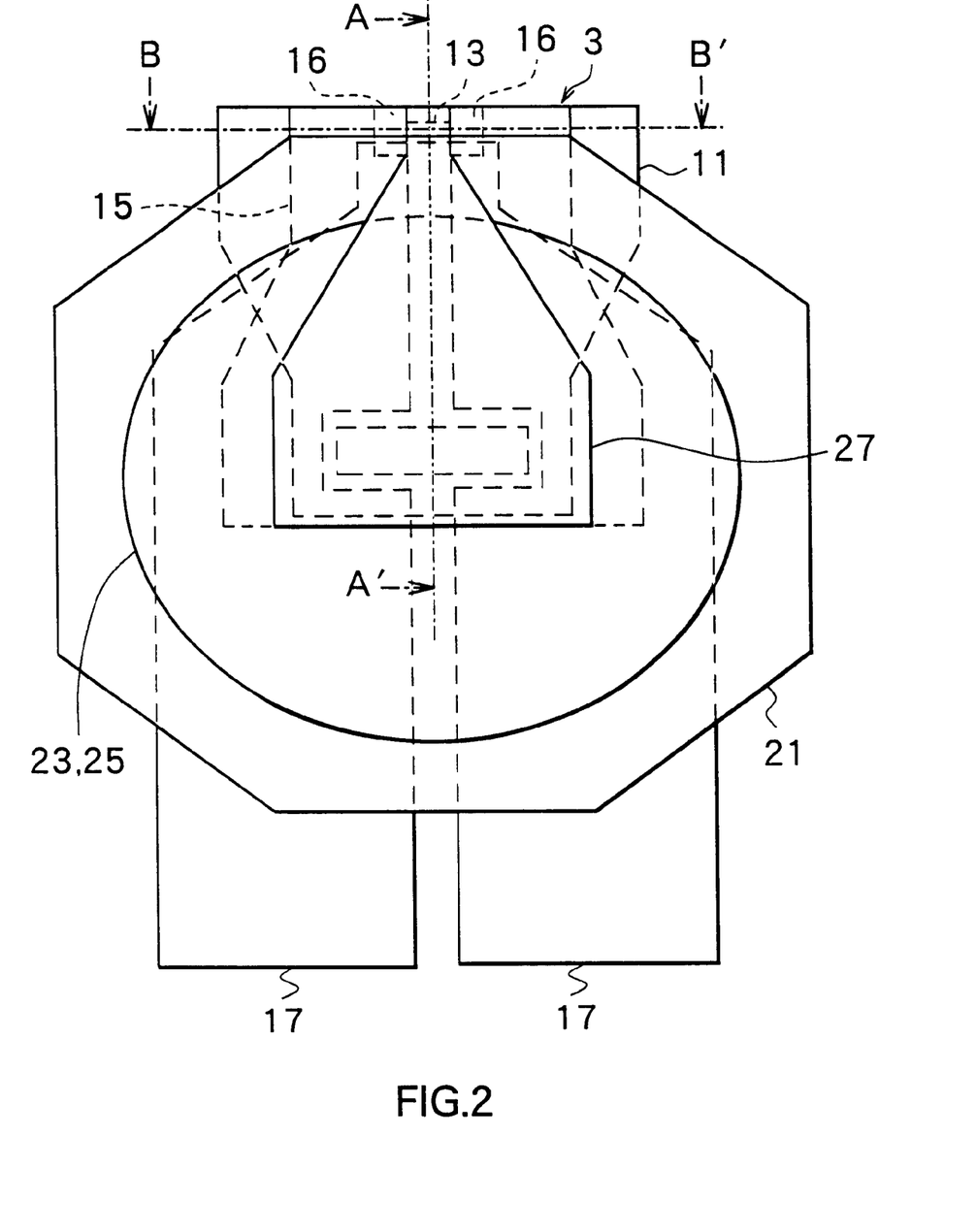
FIG. 2 is a plan view showing the configuration of the thin film magnetic head shown in FIGS. 1A and 1B.

FIGS. 1A and 1B show a cross sectional configuration of a thin film magnetic head according to an embodiment of the invention, while FIG. 2 shows a plane configuration of the thin film magnetic head shown in FIGS. 1A and 1B. FIG. 1A shows a cross section taken along a line A–A' shown in FIG. 2, which is vertical to the air bearing surface, and FIG. 1B shows a cross section taken along a line B–B' shown in FIG. 2, which is parallel to the air bearing surface of the pole portion.

This thin film magnetic head has a configuration in which a reproducing head 10 for reading-out and a recording head 20 for writing are stacked on one surface (top surface in FIGS. 1A and 1B) of a substrate 1 with an insulating film 2 in between. The substrate 1 is made of a combined material ($Al_2O_3$—TiC) which includes, for example, aluminum oxide and titanium carbide (TiC). The insulating film 2 has a thickness in the stacking direction (referred as a thickness in the followings) of about 1 to 10 $\mu$m and is made of an insulating material such as aluminum oxide.

The reproducing head 10 has a configuration in which a first shield film 11, a first shield gap film 12, an MR element 13, a second shield gap film 14 and a second shield film 15 are stacked in order from the insulating film 2 side. The first shield film 11 and the second shield film 15 are for magnetically shielding the MR element 13 and are placed to face each other sandwiching the MR element 13 in between. The first shield film 11 has a thickness of about, for example, 0.5 to 3 $\mu$m and is made of a magnetic material such as alloy (NiFe alloy) of nickel (Ni) and iron (Fe).

The second shield film 15 has a thickness of about, for example, 3 $\mu$m and is made of a magnetic material such as NiFe alloy or ferrous nitride (FeN). The second shield film 15 may have a single-layered structure or a structure in which a plurality of films made of different materials are stacked. The second shield film 15 also works as a first magnetic pole of the recording head 20.

The first shield gap film 12 and the second shield gap film 14 are for electrically isolating the first shield film 11 and the second shield film 15 from the MR element 13. For example, the first shield gap film 12 and the second shield gap film 14 have a thickness of about 10 to 100 nm and each is made of an insulating film which includes aluminum nitride as a main component. Aluminum nitride is one of the insulating materials which have high thermal conductivity so that the heat generated in the MR element 13 can be effectively dissipated. Incidentally, the insulating film is made of polycrystal in most of the cases.

The (002) planes of aluminum nitride included in the first shield gap film 12 and the second shield gap film 14 are oriented to the vertical direction (here, vertical direction to one surface of the substrate 1) to the film surface. It is because higher thermal conductivity can be obtained compared to the case where a plurality of crystal surfaces are oriented.

It is preferable that each insulating film forming the first shield gap film 12 and the second shield gap film 14 includes a little argon (Ar) in addition to aluminum nitride. It is because the hardness of aluminum nitride, which is lower than that of aluminum oxide, can be increased by adding a little argon. Accordingly, for example, when forming an air bearing surface 3 by polishing, excessive polishing of the first shield gap film 12 and the second shield gap film 14 can be avoided.

It is preferable that the content of argon in each insulating film falls within the range of 0.1 atomic % and 5.0 atomic %, and is more preferable that it falls within the range of 1.0 atomic % and 3.0 atomic %. It is most preferable that it falls within the range of 1.5 atomic % and 2.5 atomic %. The reason is because if the content of argon is less than 0.1 atomic %, the hardness does not become high enough, while the hardness goes down if the content of argon is more than 5.0 atomic %.

Further, it is preferable that each insulating film forming the first shield gap film 12 and the second shield gap film 14 include oxygen (O) in addition to aluminum nitride. It is because the compressive stress of aluminum nitride, which is larger than that of aluminum oxide, can be decreased by adding oxygen. Accordingly, exfoliation of the first shield gap film 12 and the second shield gap film 14 can be suppressed. Oxygen may be included by being chemically combined to at least either aluminum or nitrogen, or by not being chemically combined to either of them.

It is preferable that the content of oxygen in each insulating film falls within the range of 1 atomic % and 25 atomic %, and is more preferable that it falls within the range of 5 atomic % and 20 atomic %. It is most preferable that it falls within the range of 10 atomic % and 15 atomic %. It is because if the content of oxygen is less than 1 atomic %, the stress can not be sufficiently decreased, while the thermal conductivity goes down if the content of oxygen is more than 25 atomic %.

The MR element 13 is for reading out information written on a magnetic recording medium (not shown) and is placed on the air bearing surface 3 side. As the MR element 13, there are an AMR element using anisotropic magnetoresistive (referred as AMR in the followings) effect and a GMR element using giant magnetoresistive (referred as GMR in the followings) effect. The MR element 13 may be formed of either one of them.

For example, an AMR element comprises an AMR film having an AMR effect. The AMR film has, for example, a single-layered structure made of a magnetic material which exhibits an MR effect. On the other hand, a GMR element comprises a GMR film having a GMR effect. The GMR film has, for example, a multi-layered structure in which a plurality of films are stacked. The layered structure depends on the mechanism in which the GMR effect generates. For example, as a GMR film, there are a superlattice GMR film, a spin valve film, and a granular film. The reproducing output using the GMR element is three to five times higher than using the AMR effect. It is because the GMR film exhibits a greater change in resistance compared to the AMR film under a specific external magnetic field.

An MR height is about, for example, 0.1 to 2.0 µm. The MR height is one factor for determining the reproducing output, and the shorter the MR height is, the higher the reproducing output becomes. However, when the MR height is too short, the reproducing output decreases because of a rise in the temperature of the MR element 13, while the life of the MR element 13 becomes shorter. Therefore, it is preferable that the MR height is short to a degree that it is not influenced by a rise in the temperature. The thickness of the MR element 13 is, for example, tens of nanometers.

A pair of electrode films 16 placed to sandwich the MR element 13 in between are electrically connected to the MR device 13, respectively. Each of the electrode films 16 is formed in between the first shield gap film 12 and the second shield gap film 14 as the MR element 13. The electrode film 16 has a thickness of about, for example, tens to hundreds of nanometers, and has a structure in which a permanent magnet film and a conductive film are stacked. For example, the permanent magnet film is made of cobalt (Co) and platinum (Pt), and the conductive film is made of tantalum (Ta).

Each of lead electrode films 17 are electrically connected to each of the electrode films 16 on the opposite side of the air bearing surface 3 (see FIG. 2). The electrode films 17 are extended from the electrode films 16 towards the opposite side of the air bearing surface 3, and are formed in between the first shield gap film 12 and the second shield gap film 14 like the electrode films 16. The lead electrode films 17 have a thickness of about, for example, 50 to 100 nm, and are made of copper (Cu).

The recording head has a configuration in which a write gap 21, a photoresist 22, a thin film coil 23, a photoresist 24, a thin film coil 25, a photorsist 26 and a second magnetic pole 27 are stacked in this order from the second shield film (the first magnetic pole) 15 side. The write gap 21 has a thickness of about, for example, 0.1 to 0.3 µm, and is made of an insulating material such as aluminum oxide. The write gap 21 comprises a contact hole 21a in the center area of the thin film coils 23 and 25, through which the second shield film 15 and the second magnetic pole 27 are in contact with and magnetically coupled to each other.

The photoresist 22 determines the throat height and has a thickness of about, for example, 1.0 to 5.0 µm. The photoresist 22 is placed to have a little space in between the air bearing surface 3. The second magnetic pole 27 is in contact with the write gap 21 in the area adjacent to the air bearing surface 3. The photoresist 22 comprises a contact hole 22a in a location corresponding to the contact hole 21a of the write gap 21 so as to make the second shield film 15 contact with the second magnetic pole 27. The thin film coils 23 and 25 have a thickness of about, for example, 3 µm, and are placed in a location corresponding to the photoresist 22, respectively. The photoresists 24 and 26 are for maintaining the insulating characteristic of the thin film coils 23 and 25, and are placed in a location corresponding to the thin film coils 23 and 25, respectively.

The second magnetic pole 27 has a thickness of about, for example, 3 µm, and is made of a magnetic material such as NiFe alloy or ferrous nitride. The second magnetic pole 27 is extended from the air bearing surface 3 to the center area of the thin film coils 23 and 25, and is in it contact with the write gap 21 adjacent to the air bearing surface 3. In the meantime, the second magnetic pole 27 is in contact with the second shield film 15 in the center area of the thin film coils 23 and 25 to be magnetically coupled.

At the air bearing surface 3, each the second magnetic pole 27, the write gap 21 and the second shield film 15 form so-called a trim structure. This structure is effective for suppressing an increase in the effective track width due to the spread of the magnetic flux generated at the time of writing of the narrow track.

An overcoat layer 4 is formed to cover the whole surface of the recording head 20 on the opposite side (upper side in FIGS. 1A and 1B) of the reproducing head 10. The overcoat layer 4 has a thickness of, for example 20 to 30 µm, and is made of an insulating material such as aluminum oxide. The overcoat layer 4 is omitted in FIG. 2.

The thin film magnetic head having such configuration can be manufactured as described in the followings.

FIGS. 3A, 3B to FIGS. 9A, 9B show each step of manufacturing the thin film magnetic head. In FIGS. 3A, 3B to FIGS. 9A, 9B, "A" show a cross section taken along a line A–A' vertical to the air bearing surface shown in FIG. 2, while 'B' show a cross section taken along a line B–B' parallel to the air bearing surface 3 of the pole portion shown in FIG. 2.

Figure 3A:
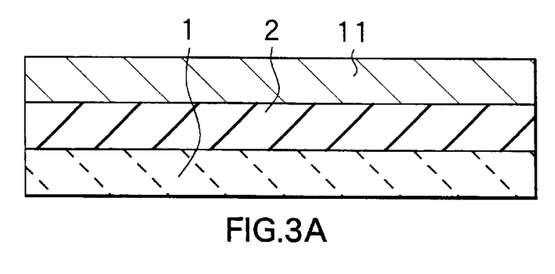
FIGS. 3A and 3B are cross sections showing a step of manufacturing a thin film magnetic head shown in FIGS. 1A and 1B.
Figure 3B:
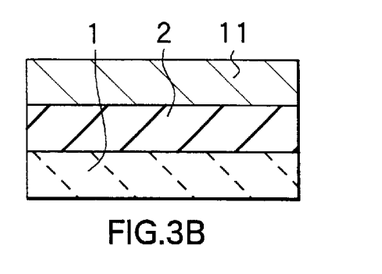

First, as shown in FIGS. 3A and 3B, for example, an insulating film 2 made of an insulating material such as aluminum oxide is formed on a substrate 1 made of a combined material including such as aluminum oxide and titanium carbide by, for example, sputtering. Then, a first shield film 11 made of a magnetic material such as NiFe alloy is selectively formed on the insulating film 2 by, for example, sputtering.

Figure 4A:
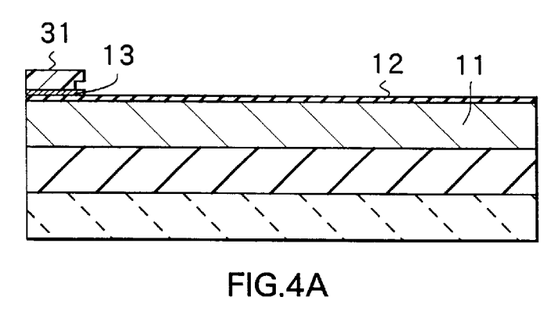
FIGS. 4A and 4B show cross sections showing a manufacturing step following the step shown in FIGS. 3A and 3B.
Figure 4B:
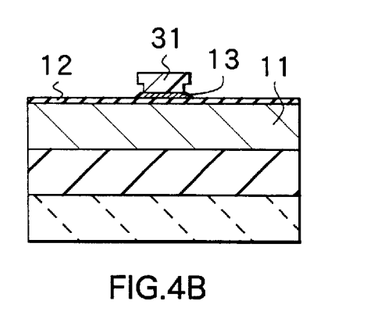

As shown in FIGS. 4A and 4B, a shield gap film 12 made of an insulating film which includes aluminum nitride as a main component is formed on the first shield film 11 by, for example, sputtering. At this time, the (002) plane of aluminum nitride is made to be oriented to the vertical direction to the surface of the insulating film. The first shield gap film 12 may be formed of an insulating film which includes aluminum nitride and argon by inserting argon to the atmosphere inside the device. Further, the first shield gap film 12 may be formed of an insulating film which includes aluminum nitride and oxygen by inserting oxygen to the atmosphere inside the device.

After forming the first shield gap film 12, as also shown in FIGS. 4A and 4B, an MR film for forming an MR element 13 is formed thereon by, for example, sputtering. After forming the MR film, a photoresist pattern 31 is selectively formed thereon in a location where the MR element 13 is to be formed. At this time, the photoresist pattern 31 is formed to have, for example, a T-shaped cross section so that lift-off can be easily performed. Then, the MR element 13 is formed through etching the MR film by, for example, ion milling using the photoresist pattern 31 as a mask.

Figure 5A:
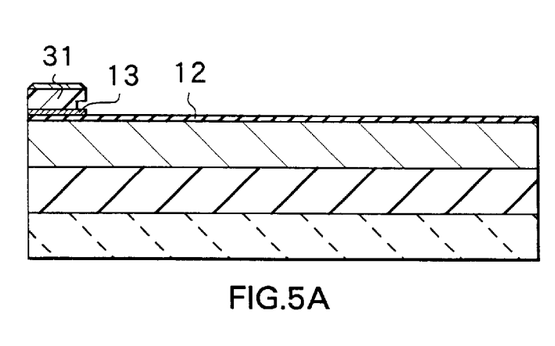
FIGS. 5A and 5B show cross sections showing a manufacturing step following the step shown in FIGS. 4A and 4B.
Figure 5B:
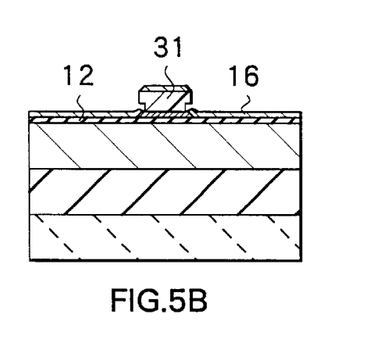

After forming the MR element 13, as shown in FIGS. 5A and 5B, each of the electrode films 16 is selectively formed on the first shield gap film 12 by, for example, sputtering using the photoresist pattern 31 as a mask. The electrode films 16 are formed by stacking, for example, a permanent magnet film made of CoPt alloy and a conductive film made of tantalum, respectively.

Figure 6A:
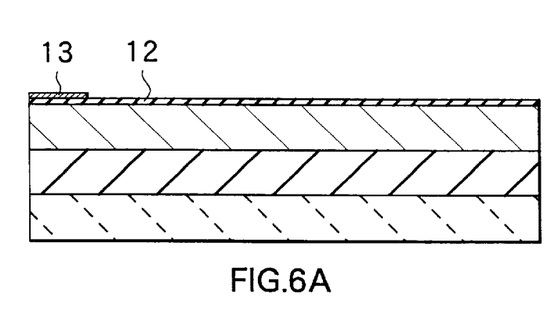
FIGS. 6A and 6B show cross sections showing a manufacturing step following the step shown in FIGS. 5A and 5B.
Figure 6B:
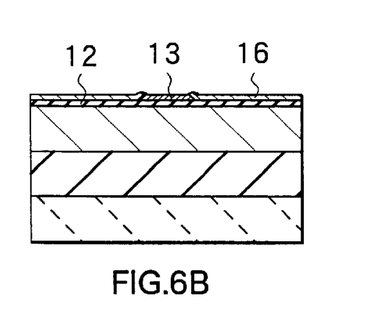

After forming the electrode films 16, as shown in FIGS. 6A and 6B, the photoresist pattern 31 is lifted off. Then, although not shown in FIGS. 6A and 6B, each of the lead electrode films 17 (FIG. 2) made of copper is selectively formed on the first shield gap film 12 by, for example, sputtering.

Figure 7A:
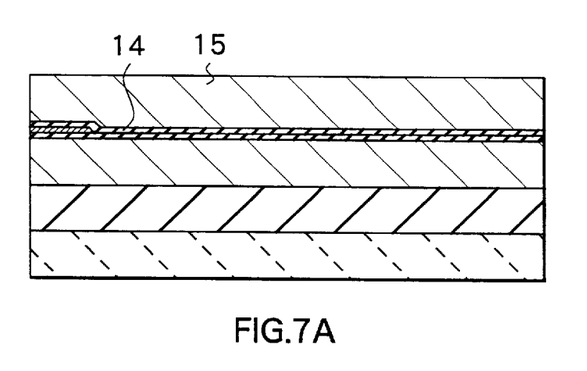
FIGS. 7A and 7B show cross sections showing a manufacturing step following the step shown in FIGS. 6A and 6B.
Figure 7B:
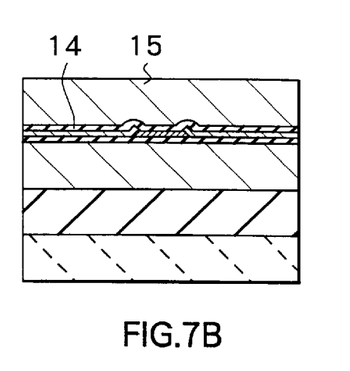

After forming each of the lead electrode films 17, as shown in FIGS. 7A and 7B, a second shield gap film 14 is formed on the first shield gap film 12, the MR element 13, each of the electrode films 16 and each of the lead electrode films 17 in the same manner the first shield gap film 12 is formed. Then, a second shield film 15 made of a magnetic material such as NiFe alloy or ferrous nitride is selectively formed on the second shield gap film 14 by, for example, sputtering.

Figure 8A:
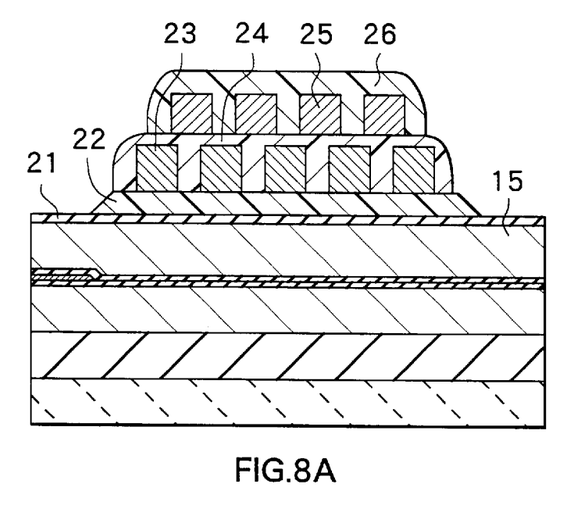
FIGS. 8A and 8B show cross sections showing a manufacturing step following the step shown in FIGS. 7A and 7B.
Figure 8B:
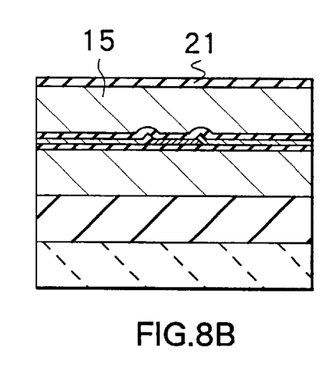

After forming the second shield film 15, as shown in FIGS. 8A and 8B, a write gap 21 made of an insulating material such as aluminum oxide is formed thereon by, for example, sputtering. Then, a photoresist 22 is selectively formed on the write gap 21 by lithography technique. Next, a thin film coil 23 is selectively formed on the photoresist 22 by, for example, sputtering. A photoresist 24 is selectively formed on the photoresist 22 and the thin film coil 23 in the same manner the photoresist 22 is formed, and a thin film coil 25 is selectively formed thereon in the same manner the thin film coil 23 is formed. Then, a photoresist 26 is selectively formed on the photoresist 24 and the thin film coil 25 in the same manner the photoresist 22 is formed.

Figure 9A:
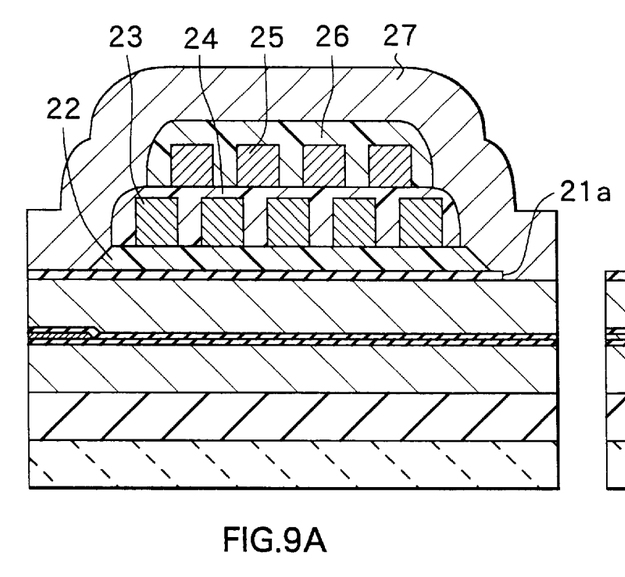
FIGS. 9A and 9B show cross sections showing a manufacturing step following the step shown in FIGS. 8A and 8B.
Figure 9B:
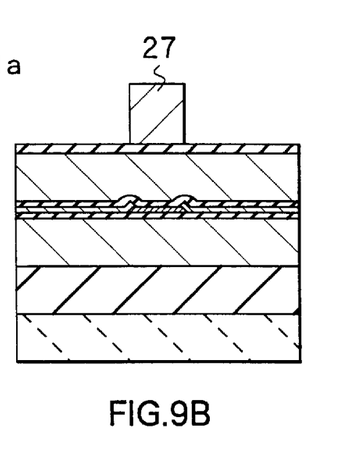

After forming the photoresist 26, as shown in FIGS. 9A and 9B, a contact hole 21a is formed in the center area of the thin film coils 23 and 25 by partially etching the write gap 21. Then, a second magnetic pole 27 made of a magnetic material such as NiFe alloy or ferrous nitride is selectively formed on the write gap 21, the photoresists 22, 24 and 26 by, for example, sputtering.

After forming the second magnetic pole 27, part of the write gap 21 and the second shield film 15 are etched by ion milling using the second magnetic pole 27 as a mask. Then, an overcoat layer 4 made of aluminum oxide is formed on the second magnetic pole 27 by, for example, sputtering. At last, an air bearing surface 3 of a recording head 20 and a reproducing head 10 is formed by performing a machine processing on the slider. At this time, the first shield gap film 12 and the second shield gap film 14 are formed of an insulating film which includes aluminum nitride and argon so as to improve their hardness. Accordingly, the first shield gap film 12 and the second shield gap film 14 can be prevented from exceedingly polished at the time of machine processing. Thereby, a thin film magnetic head shown in FIGS. 1A and 1B is completed.

In a thin film magnetic head manufactured as described, information is recorded on a magnetic recording medium (not shown) by generating magnetic flux for writing through flowing electric current into the thin film coils 23 and 25 of the recording head 20. On the other hand, information recorded on the magnetic recording medium (not shown) is read out by detecting magnetic flux leaked from the magnetic recording medium (not shown) through flowing sense current into the MR element 13 of the reproducing head 10.

At this time, Joule heat is generated in the MR element 13 by sense current. The first shield gap film 12 and the second shield gap film 14 are formed of an insulating film which includes aluminum nitride, the (002) plane of which is oriented to the vertical direction to the surface of the insulating film so that they have a high thermal conductivity. As a result, the heat generated in the MR element 13 is effectively transmitted to the first shield film 11 and the second shield film 15 through the first shield gap film 12 and the second shield gap film 14, and is effectively dissipated. Accordingly, a rise in the temperature of the MR element 13 is suppressed. In other words, reproducing output is improved and life of the MR element 13 is extended.

In the thin film magnetic head, if the first shield gap film 12 and the second shield gap film 14 are formed of an insulating film which includes aluminum nitride and oxygen, the compressive stress of the first and the second shield gap films 12 and 14 is decreased. As a result, exfoliation of the first shield gap film 12 and the second shield gap film 14 is avoided. In the mean time, the qualities of the first and the second shield gap films 12 and 14 are improved while their lives are extended.

As described, in the thin film magnetic head according to the embodiment, the first shield gap film 12 and the second shield gap film 14 are formed of an insulating film which includes aluminum nitride, the (002) plane of which is oriented to the vertical direction to the surface of the insulating film. As a result, the thermal conductivity of the first and the second shield gap film 12 and 14 can be improved. Therefore, the heat generated in the MR element 13 at the time of reading-out can be effectively transmitted to the first shield film 11 and the second shield film 15 through the first shield gap film 12 and the second shield gap film 14 to be dissipated. Accordingly, a rise in the temperature of the MR element 13 can be suppressed. In the mean time, reproducing output can be improved while the life of the MR element 13 is extended.

If the first shield gap film 12 and the second shield gap film 14 are formed of an insulating film which includes aluminum nitride and argon, the hardness of the first and the second shield gap films 12 and 14 can be increased. As a result, excessive etching of the first shield gap film 12 and the second shield gap film 14 can be avoided at the time of forming the air bearing surface 3 by machine processing.

Furthermore, if the first shield gap film 12 and the second shield gap film 14 are made of an insulating film which includes aluminum nitride and oxygen, the compressive stress of the first and the second shield gap films 12 and 14 can be decreased. As a result, exfoliation of the first shield gap film 12 and the second shield gap film 14 is avoided. In the mean time, the qualities of the first and the second shield gap films 12 and 14 are improved while their lives are extended.

In addition, in the method of manufacturing a thin film magnetic head according to the embodiment, sputtering is used for forming the first shield gap film 12 and the second shield gap film 14, and the (002) plane of aluminum nitride is oriented to the vertical direction to the surface of the insulating film. As a result, the thin film magnetic head according to the embodiment can be easily manufactured.

Moreover, at this time, an insulating film including aluminum nitride and argon can be easily formed by inserting argon into the atmosphere inside the device. Therefore, a thin film magnetic head according to the embodiment can be easily manufactured. In addition, at this time, an insulating film including aluminum nitride and oxygen can be easily formed by inserting oxygen into the atmosphere inside the device. As a result, a thin film magnetic head according to the embodiment can be easily manufactured.

EXAMPLES

Specific examples of the embodiment of the invention will be described in detail in the followings.

First Example

In this example of the embodiment, the first shield gap film 12 and the second shield gap film 14 were formed of an insulating film in which the (002) plane of aluminum nitride was oriented to the vertical direction of the surface of the insulating film. Then, the characteristic of the reproducing head 10 described in the above-mentioned embodiment was examined. Accordingly, it will be described using identical numerals to the above-mentioned embodiment with reference to FIGS. 1A and 1B.

First, a first shield film 11 made of NiFe alloy of 2 μm in thickness was formed on a substrate 1 made of a combined material which included aluminum oxide and titanium carbide by sputtering with an insulating film 2 made of aluminum oxide in between. Then, a first shield gap film 12 made of a polycrystal insulating film of 70 nm in thickness which mainly included aluminum nitride was formed on the first shield film 11 by RF (Radio Frequency) magnetron sputtering. At this time, aluminum was used as a target, and argon gas and nitride gas were inserted into the atmosphere inside the device to make it the combined-gas atmosphere. Further, the orientation of the crystal of aluminum nitride was controlled by adjusting the bias voltage applied to the substrate 1. At this time, the bias voltage was set to 0 V, and the (002) plane of aluminum nitride was oriented to the vertical direction to the surface of the insulating film.

Figure 10:
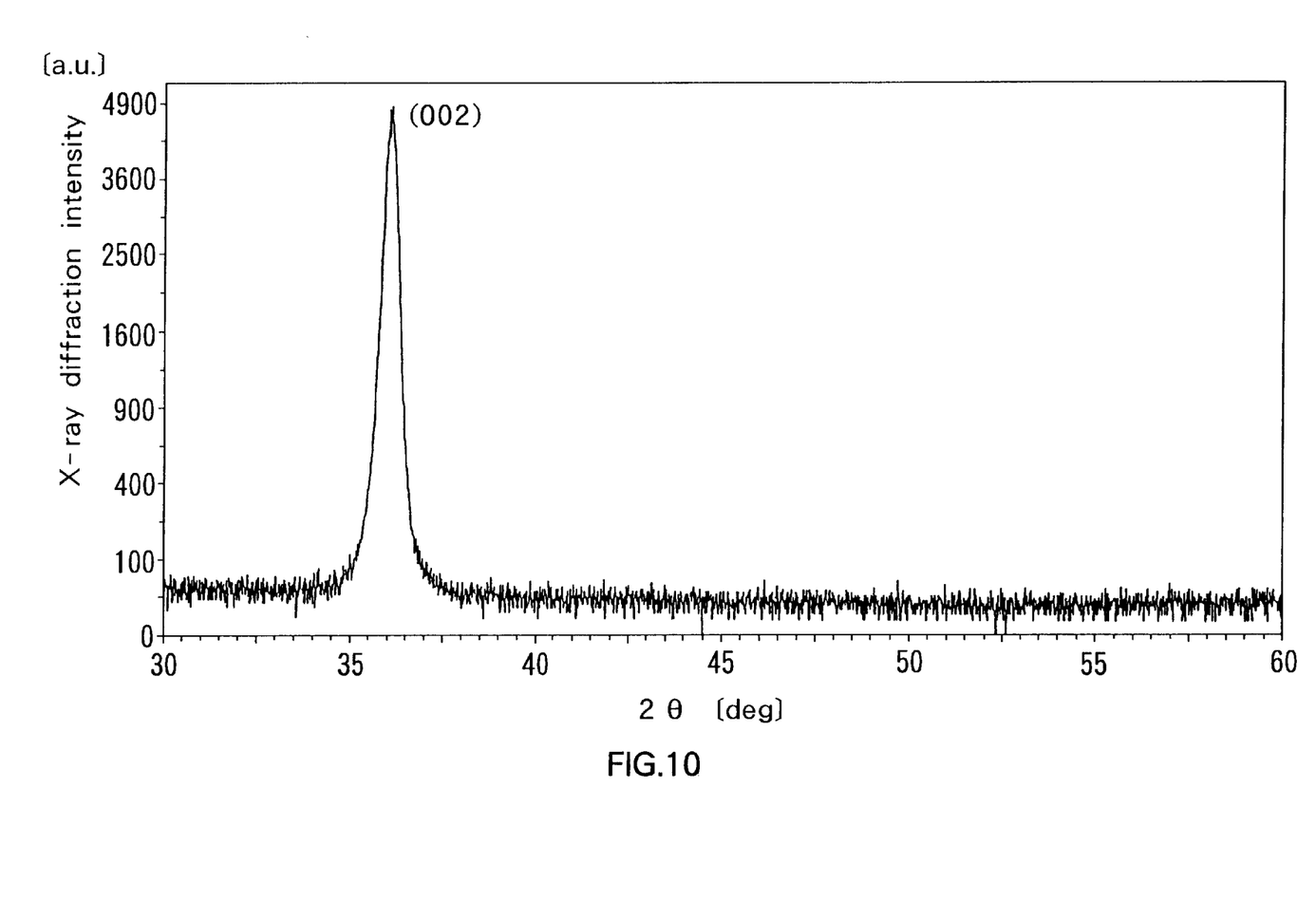
FIG. 10 shows a X-ray diffraction pattern of a first shield gap film in a first example of the invention.

The orientation of aluminum nitride in the first shield gap film 12 formed as described was examined by X-ray diffraction. The X-ray diffraction pattern is shown in FIG. 10. As shown in the figure, there is only one peak indicating the (002) plane of aluminum nitride in the X-ray diffraction pattern, but no other peaks. In other words, it was verified that the (002) plane of aluminum nitride was oriented to the vertical direction to the surface of the insulating film in the first shield gap film 12.

Figure 11:
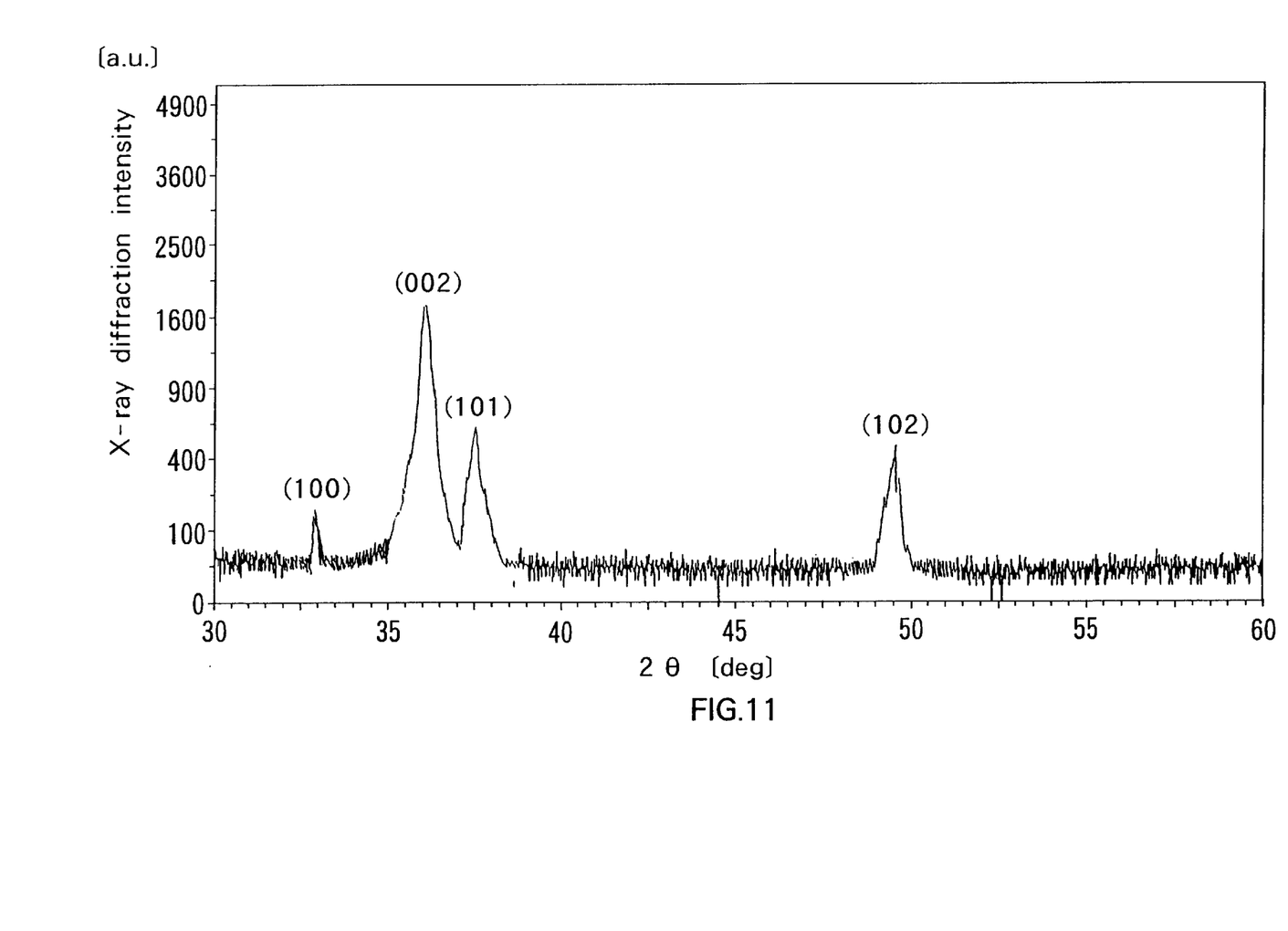
FIG. 11 shows a comparison of X-ray diffraction pattern.

As a comparison, a first shield gap was formed under the same condition as the example, except that the bias voltage applied to the substrate 1 was −100 V and the orientation was examined by X-ray diffraction. FIG. 11 shows the X-ray diffraction pattern. As shown in FIG. 11, there are peaks indicating the (100), (002), (101) and (102) faces of aluminum nitride in the X-ray diffraction pattern. In other words, it was verified that a plurality of the surfaces of aluminum nitride was oriented to the vertical direction to the surface of the insulating film in the first shield gap film 12. Accordingly, it was proved that the orientation of the crystal of aluminum nitride can be controlled by adjusting the voltage applied during sputtering.

Then, an MR element 13 was formed by stacking an alloy film of 12 nm in thickness made of nickel of 12, iron and chrome (Cr), a tantalum film of 7.5 nm in thickness and an NiFe alloy film of 12 nm in thickness in order on the first shield gap film 12 by sputtering, and by selectively etching them. After forming the MR element 13, each of the electrode films 16 is selectively formed by laminating a permanent magnet film of 50 nm in thickness made of CoPt alloy and a conductive film made of 100 nm in thickness made of tantalum in order on the first shield gap film 12 by, for example, sputtering.

After forming each of the electrode films 16, each lead electrode film 17 of 100 nm in thickness made of copper was formed on the first shield gap film 12 by sputtering. After forming each of the lead electrode films 17, a second shield gap film 14 was formed on the first shield gap film 12, the MR element 13, each electrode film 16 and each lead electrode film 17 in the same manner the first shield gap film 12 was formed.

After forming the second shield gap film 14, a second shield film 15 made of NiFe alloy was selectively formed thereon by sputtering. Then, an air bearing surface 3 was formed by performing machine processing on the slider. At this time, a plurality of the MR elements 13 with different resistance were formed by varying the MR height. As a result, a plurality of reproducing heads 10 having the MR elements 13 with different resistance were completed, respectively.

First, the temperature coefficient of each MR element 13 in each of the reproducing heads 10 formed as described was obtained. Specifically, the temperature of coefficient was obtained through increasing the temperature of each reproducing head 10 by placing them in a heater and measuring changes in the resistance of the MR elements 13 by every specific temperature after flowing 1 mA of direct current, the amount of which was so small that the rise in the temperature can be ignored.

Figure 12:
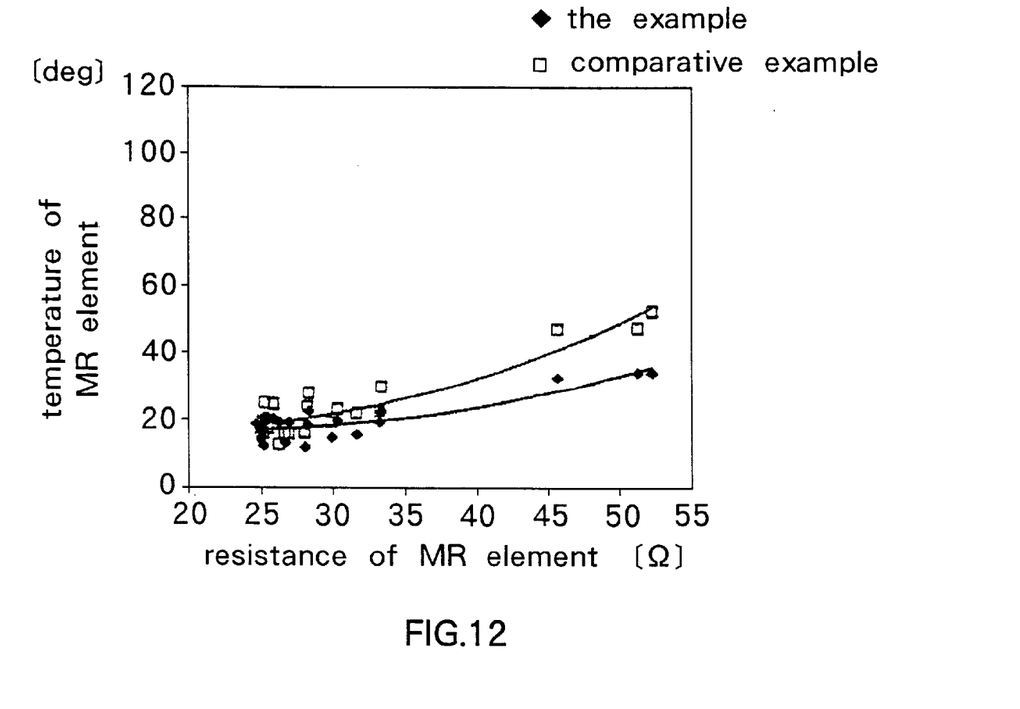
FIG. 12 is a characteristic figure showing a correlation of the resistance and the temperature of an MR element in the first example of the invention.

Then, changes in the resistance of the MR elements 13 in the reproducing heads 10 were measured, respectively, after flowing sense current into the MR elements 13. The temperature of each MR element 13 is obtained from this result and each temperature coefficient obtained earlier. The correlation of resistance and temperature in the MR element 13 is shown in FIG. 12. From this correlation, it is possible to obtain how much of the heat, which was generated according to the resistance of the MR elements 13 when sense current was flown, was dissipated. That is, if a rise in the temperature of the MR element 13 is large, the dissipation efficiency is low. On the contrary, if a rise in the temperature is small, the dissipation efficiency is large.

As a comparison, a reproducing head was formed under the same condition as the example, except that the first shield gap film and the second shield gap film were formed of an insulating film in which a plurality of surfaces of aluminum nitride were oriented to the vertical direction to the surface film. In this comparison, correlation of the resistance and the temperature of each MR element 13 was also examined like the example. The results are shown in FIG. 12 as well.

It can be seen from FIG. 12 that a rise in the temperature of each MR element 13 of the example is lower compared to that of the comparison, and the heat generated in the MR element 13 can be dissipated more effectively in the example. That is, it was proved that the thermal conductivity can be improved when the (002) plane of aluminum nitride is oriented to the vertical direction to the surface of the insulating film.

Second Example

In this example of the embodiment, an insulating film which includes aluminum nitride and argon was formed, and the characteristic was examined.

A polycrystal insulating film which mainly includes aluminum nitride and a little argon was formed on a test substrate by RF magnetron sputtering. At this time, aluminum was used as a target and argon gas and nitride gas were inserted into the atmosphere inside the device. Further, a plurality of insulating films including different amount of argon were formed by varying bias voltage to be applied. In the embodiment, the (002) plane of aluminum nitride was also oriented to the vertical direction to the surface of the insulating film by adjusting bias voltage.

Figure 13:
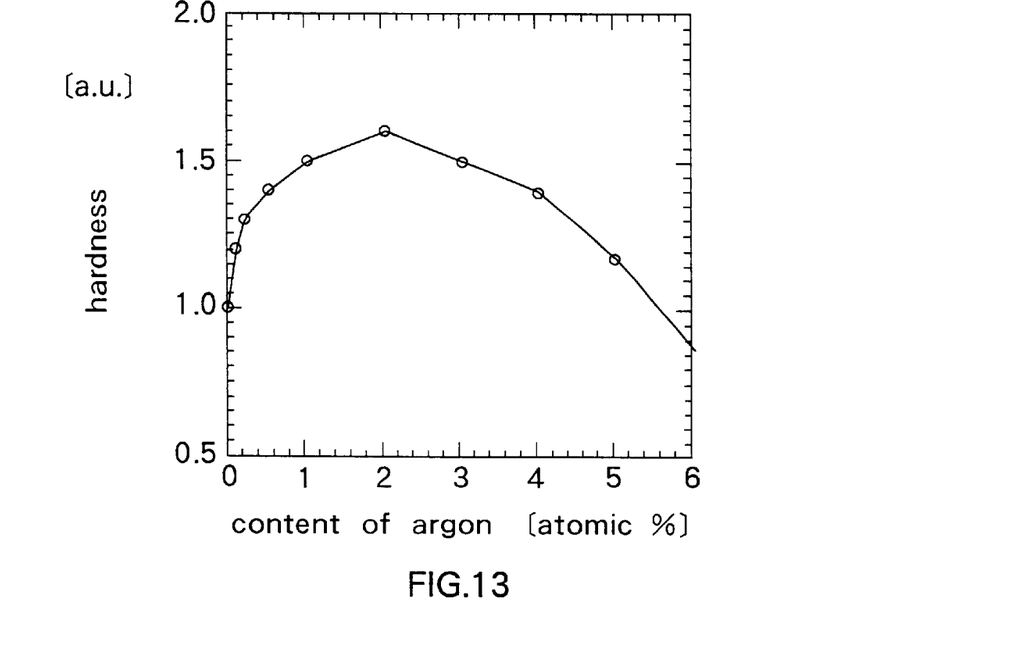
FIG. 13 is a characteristic figure showing a correlation of the content of argon and the hardness in the second example of the invention.

The amount of argon included in each insulating film formed as described was measured by X-ray fluorescence analysis. The hardness of each insulating film was also measured by the Vickers hardness measure. The correlation of amount of argon included in the insulating film and the hardness is shown in FIG. 13. From FIG. 13, it is verified that the hardness is not high enough when the amount of argon is too small, and the hardness is low when the amount of argon is too large. Specifically, it is preferable that the content of argon by percentage falls within the range of 0.1 atomic % and 5.0 atomic %, and is more preferable that it falls within the range of 1.0 atomic % and 3.0 atomic %. It is most preferable that it falls within the range of 1.5 atomic % and 2.5 atomic %.

Third Example

In this example of the embodiment, the first shield gap film 12 and the second shield gap film 14 of the reproducing head 10 described in the above-mentioned embodiment were formed of an insulating film which includes aluminum nitride and oxygen, and the characteristic was examined. It will be described with reference to FIGS. 1A and 1B using identical numerals to the above-mentioned embodiment.

First, a first shield film 11 was formed on a substrate 1 in the same manner as in the first example with an insulating film 2 in between. Then, a first shield gap film 12 made of an insulating film which includes aluminum nitride and oxygen was formed in the same manner as in the first example. At this time, argon gas, nitride gas and oxygen gas were inserted into the atmosphere inside the device and a plurality of the first shield gap films 12 including different amount of oxygen were formed by varying the concentration of oxygen. Incidentally, in this example, the (002) plane of aluminum nitride was oriented to the vertical direction to the surface of the insulating film. At this time, the content of oxygen in each of the first shield gap films 12 formed as described was measured by X-ray fluorescence analysis.

Further, an MR element 13, each electrode film 16 and each lead electrode film 17 were formed in order in the same manner as in the first example of the embodiment. Then, second shield gap films 14 were formed, respectively, in the same manner the first shield gap film 12 was formed. After forming the second shield gap films 14, a second shield film 15 and an air bearing surface 3 were formed, respectively, in the same manner as in the first example. Accordingly, a plurality of reproducing heads 10 including the first shield gap film 12 and the second shield gap film 14 with different amount of oxygen were formed, respectively.

The temperature of each reproducing head 10 formed as described was obtained by measuring changes in the resistance of each MR element 13 when flowing sense current of 10 mA in the same manner as in the first example. The correlation of content of oxygen and the temperature of the MR element is shown in FIG. 14.

An insulating film including aluminum nitride and oxygen, in which the (002) plane of aluminum nitride was oriented to the vertical direction to the surface of the insulating film, was formed on a substrate made of silicon (Si) in the same manner as in the first shield gap film 11 mentioned above was formed. At this time, a plurality of insulating films with different amount of oxygen were formed as well. Then, the amount of oxygen included in each of the insulating film was measured by X-ray fluorescence analysis while the stress was measured from the warp of the substrate. The correlation of the content of oxygen and the stress is also shown in FIG. 14.

Figure 14:
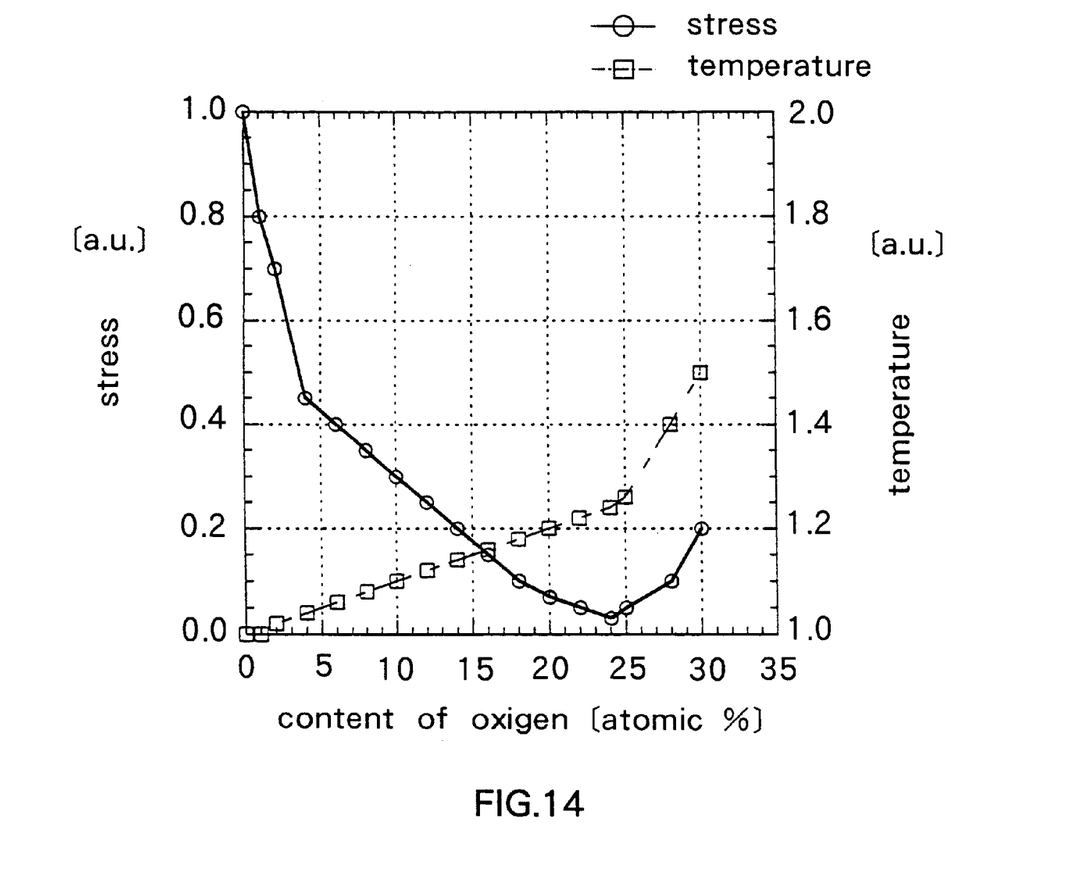
FIG. 14 is a characteristic figure showing a correlation of the content of oxygen, the stress, and the temperature of the MR element in the third example of the invention.

From FIG. 14, it is verified that the stress can not be sufficiently decreased if the content of oxygen is too small, and the thermal conductivity becomes low if the content of oxygen is too large. Specifically, it is preferable that the content of oxygen by percentage falls within the range of 1 atomic % and 25 atomic %, and is more preferable that it falls within the range of 5 atomic % and 20 atomic %. It is most preferable that it falls within the range of 10 atomic % and 15 atomic %.

Although the invention has been described by referring to the embodiment and each example, it is not limited to those but various modification can be applicable. For example, in the above-mentioned embodiment, the whole portion of the first shield gap film 12 and the second shield gap film 14 is formed of an insulating film including aluminum nitride, the (002) plane of which is oriented to the vertical direction to the surface of the insulating film. However, at least part of at least either of the shield gap films may be formed of such insulating film. Further, the same can be said in the case where the shield gap films are formed of an insulating film which includes argon or oxygen, or both of them in addition to aluminum nitride.

Further, in the above-mentioned embodiment, the case where the first shield gap film 12 and the second shield gap film 14 are made of such insulating film is described. However, the insulating film 2, the write gap 21, the photoresists 22, 24, 26 or the overcoat layer 4 may be formed of such insulating film.

In addition, in the above-mentioned embodiment, the case where the invention is applied to a thin film magnetic head is described. However, the invention may be widely applied to thin film devices comprising an insulating film and is especially effective to the case where radiation of heat is an issue.

Furthermore, in the above-mentioned embodiment, a thin film magnetic head having a configuration in which a reproducing head 10 is formed on a substrate 1 side and a recording head 20 is formed thereon is described. However, the thin film magnetic head may have a configuration in which a recording head is formed on a substrate 1 side and a reproducing head is formed thereon.

Moreover, in the above-mentioned embodiment, the case where a magnetoresistive element of the invention is applied to a thin film magnetic head is described. However, it is also applicable to, for example, an MR sensor for detecting acceleration.

According to the thin film device of the invention as described above, thermal conductivity can be improved since it is made to include an insulating film in which the (002) plane of aluminum nitride is oriented to the vertical direction to the surface of the insulating film. As a result, heat generated in the thin film device can be effectively dissipated and a rise in the temperature of the thin film device can be suppressed.

Especially, according to the thin film device of the invention, the hardness of the insulating film can be increased since the insulating film further includes argon. As a result, processing of the thin film device becomes easier.

In addition, according to the thin film device of the invention, the stress of the insulating film can be decreased since the insulating film further includes oxygen. As a result, exfoliation of the insulating film can be avoided. Accordingly, the quality of the thin film device is improved while the life can be extended.

Furthermore, according to the thin film magnetic head of the invention, thermal conductivity of at least either the first shield gap film or the second shield gap film can be improved since at least part of either the first shield gap film or the second shield gap film is formed of an insulating film in which the (002) plane of aluminum nitride is oriented to the vertical direction to the surface of the insulating film. As a result, the heat generated in the magnetoresistive element at the time of reading-out can be effectively transmitted to the first shield film and the second shield film through the first shield gap film and the second shield gap film and be dissipated. Accordingly, a rise in the temperature of the magnetoresistive element is avoided, and reproducing output can be improved while the life can be extended.

Especially, according to the thin film magnetic head in one aspect of the invention, the hardness of at least either the first shield gap film or the second shield gap film can be increased since at least part of either the first shield gap film or the second shield gap film is formed of an insulating film which further includes argon. As a result, when forming an air bearing surface by machine processing, excessive polishing of the first shield gap film and the second shield gap film can be avoided.

Further, according to the thin film magnetic head in one aspect of the invention, the stress of at least either the first shield gap film or the second shield gap film can be decreased since at last part of either the first shield gap film or the second shield gap film is formed of an insulating film which further includes oxygen. As a result, exfoliation of the first shield gap film and the second shield gap film can be avoided. Accordingly, the quality of the thin film magnetic head is improved while the life can be extended.

In addition, according to the magnetoresistive element of the invention, thermal conductivity of the insulating film can be improved since the (002) plane of aluminum nitride in the insulating film is oriented to the vertical direction to the surface of the insulating film. As a result, heat generated in the magnetoresistive element can be effectively dissipated and a rise in the temperature of the magnetoresistive element can be suppressed.

Especially, according to the magnetoresistive element in one aspect of the invention, the hardness of the insulating film can be increased since the insulating film further includes argon. Accordingly, the magnetoresistive element is easily processed.

Furthermore, according to the magnetoresistive element in one aspect of the invention, the stress of the insulating film can be decreased since the insulating film further includes oxygen. As a result, exfoliation of the insulating film can be avoided. Accordingly, the quality of the magnetoresistive element is improved while the life can be extended.

Moreover, according to methods of manufacturing a thin film device, a thin film magnetic head and a magnetoresistive element of the invention, the thin film device and the thin film magnetic head can be easily manufactured since the (002) plane of aluminum nitride is oriented to the vertical direction to the surface of the insulating film by sputtering. As a result, the thin film device, the thin film magnetic head and the magnetoresistive element of the invention can be easily implemented.

Obviously many modifications and variations of the present invention are possible in the light of the above teachings. It is therefore to be understood that within the scope of the appended claims the invention may be practiced otherwise than as specifically described.

What is claimed is:

1. A thin film device for use as a magnetic head, comprising:
   a polycrystalline insulating film that includes aluminum nitride having a (002) plane that is perpendicular to a top surface of an insulating film, wherein the insulating film includes argon within the range from 0.1 atomic % to 5.0 atomic %.

2. A thin film device according to claim 1, wherein the insulating film includes argon within the range of 1.0 atomic % and 3.0 atomic %.

3. A thin film device according to claim 1, wherein the insulating film includes argon within the range of 1.5 atomic % and 2.5 atomic %.

4. A thin film magnetic head, comprising: a magnetoresistive element, a first shield film and a second shield film placed to face each other sandwiching the magnetoresistive element in between for shielding the magnetoresistive element, a first shield gap film provided between the first shield film and the magnetoresistive element, and a second shield gap film provided between the second shield film and the magnetoresistive element, wherein:
   at least part of at least either the first shield gap film or the second shield gap film is composed of a polycrystalline insulating film that includes aluminum nitride having a (002) plane that is perpendicular to a top surface of an insulating film, and further wherein the insulating film includes argon within the range from 0.1 atomic % to 5.0 atomic %, and oxygen within the range from 1 atomic % to 25 atomic %.

5. A magnetoresistive element in combination with a polycrystalline insulating film that is at least partially formed, wherein the insulating film includes:
   aluminum nitride having a (002) plane that is perpendicular to a top surface of an insulating film;
   argon within the range from 0.1 atomic % to 5.0 atomic %; and
   oxygen within the range from 1 atomic % to 25 atomic %.

6. A thin film device, comprising a polycrystalline insulating film that includes:
   aluminum nitride having a (002) plane that is perpendicular to a top surface of an insulating film; and
   oxygen within the range from 1 atomic % to 25 atomic %.

7. A thin film device according to claim 6, wherein the insulating film includes oxygen, at least part of which being chemically combined to at least either aluminum or nitrogen.

8. A thin film device according to claim 6, wherein the insulating film includes oxygen within the range of 5 atomic % and 20 atomic %.

9. A thin film device according to claim 8, wherein the insulating film includes oxygen within the range of 10 atomic % and 15 atomic %.

10. A thin film device, comprising a polycrystalline insulating film that includes:
    aluminum nitride having a (002) plane that is perpendicular to a top surface of an insulating film;
    argon within the range from 0.1 atomic % to 5.0 atomic %; and
    oxygen within the range from 1 atomic % to 25 atomic %.

11. A thin film magnetic head, comprising: a magnetoresistive element, a first shield film and a second shield film placed to face each other sandwiching the magnetoresistive element in between for shielding the magnetoresistive element, a first shield gap film provided between the first shield film and the magnetoresistive element, and a second shield gap film provided between the second shield film and the magnetoresistive element, wherein:
    at least part of at least either the first shield gap film or the second shield gap film is composed of a polycrystalline insulating film that includes aluminum nitride having a (002) plane that is perpendicular to a top surface of an insulating film, and further wherein the insulating film includes argon within the range from 0.1 atomic % to 5.0 atomic %.

12. A thin film magnetic head comprising: a magnetoresistive element, a first shield film and a second shield film placed to face each other sandwiching the magnetoresistive element in between for shielding the magnetoresistive element, a first shield gap film provided between the first shield film and the magnetoresistive element, and a second shield gap film provided between the second shield film and the magnetoresistive element, wherein:

at least part of at least either the first shield gap film or the second shield gap film is composed of a polycrystalline insulating film that includes aluminum nitride having a (002) plane that is perpendicular to a top surface of an insulating film, and further wherein the insulating film includes oxygen within the range from 1 atomic % to 25 atomic %.

13. A magnetoresistive element in combination with a polycrystalline insulating film that is at least partially formed, wherein the insulating film includes:

aluminum nitride having a (002) plane that is perpendicular to a top surface of an insulating film; and argon within the range from 0.1 atomic % 5.0 atomic %.

14. A magnetoresistive element in combination with a polycrystalline insulating film that is at least partially formed, wherein the insulating film includes:

aluminum nitride having a (002) plane that is perpendicular to a top surface of an insulating film; and oxygen within the range from 1 atomic % to 25 atomic %.

* * * * *